US012782999B2

(12) United States Patent
Chen et al.

(10) Patent No.: US 12,782,999 B2
(45) Date of Patent: Nov. 3, 2026

(54) ELECTRONIC DEVICE AND CLOCK JITTER ANALYSIS METHOD

(71) Applicant: REALTEK SEMICONDUCTOR CORP., Hsinchu (TW)

(72) Inventors: Ying-Chieh Chen, Hsinchu (TW); Mei-Li Yu, Hsinchu (TW); Yu-Lan Lo, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 30 days.

(21) Appl. No.: 19/198,819

(22) Filed: May 5, 2025

(65) Prior Publication Data

US 2025/0362706 A1 Nov. 27, 2025

(30) Foreign Application Priority Data

May 27, 2024 (TW) ................................ 113119583

(51) Int. Cl.
*G06F 1/04* (2006.01)
*G06F 1/12* (2006.01)
*G06F 5/06* (2006.01)

(52) U.S. Cl.
CPC ..................................... *G06F 1/04* (2013.01)

(58) Field of Classification Search
CPC ..... G06F 1/04; G06F 1/06; G06F 1/10; G06F 1/105
See application file for complete search history.

(56) References Cited

U.S. PATENT DOCUMENTS

| | | | | |
|---|---|---|---|---|
| 2009/0039867 | A1 | 2/2009 | Saint-Laurent et al. | |
| 2012/0240087 | A1* | 9/2012 | Chang | G06F 30/367 716/108 |
| 2017/0010320 | A1* | 1/2017 | Pal | G01R 31/2834 |
| 2017/0161416 | A1* | 6/2017 | Miro Panades | G06F 1/12 |
| 2017/0364619 | A1* | 12/2017 | Chen | G01R 31/3167 |
| 2020/0151295 | A1* | 5/2020 | Chen | G06F 30/3315 |
| 2024/0370616 | A1* | 11/2024 | Ho | G06F 30/367 |
| 2025/0156618 | A1* | 5/2025 | Lin | G06F 30/327 |

FOREIGN PATENT DOCUMENTS

| | | | |
|---|---|---|---|
| CN | 111079293 | A | 4/2020 |
| CN | 113627107 | A | 11/2021 |

* cited by examiner

*Primary Examiner* — Mohammed H Rehman
(74) *Attorney, Agent, or Firm* — Birch, Stewart, Kolasch & Birch, LLP

(57) ABSTRACT

An electronic device and a clock jitter analysis method are provided. The electronic device includes a storage device and a processing device. The processing device is configured to: read timing simulation information and voltage drop information of a plurality of clock paths from the storage device; obtain a maximum voltage drop and a minimum voltage drop of each clock path based on the voltage drop information; perform a first static timing analysis (STA) with the maximum voltage drop based on the timing simulation information, to obtain a first timing report; perform a second STA with the minimum voltage drop based on the timing simulation information, to obtain a second timing report; calculate time information corresponding to each clock path based on the first timing report and the second timing report; and select largest time information of the plurality of pieces of time information as a clock jitter.

16 Claims, 4 Drawing Sheets

ELECTRONIC DEVICE AND CLOCK JITTER ANALYSIS METHOD

CROSS-REFERENCE TO RELATED APPLICATION

This non-provisional application claims priority under 35 U.S.C. § 119(a) to patent application Ser. No. 113119583 filed in Taiwan, R.O.C. on May 27, 2024, the entire contents of which are hereby incorporated by reference.

BACKGROUND

Technical Field

The present disclosure relates to a clock jitter extraction technology, and in particular, to a fast clock jitter analysis method and an electronic device for a fast clock jitter analysis.

Related Art

A clock jitter refers to an instability or a fluctuation of a clock signal in time, which is usually manifested as a periodic change or a deviation of the clock signal. The deviation may be caused by factors such as an instability of a clock source, noise of a power supply, a temperature change, and electromagnetic interference. The clock jitter may have many negative impacts, such as signal distortion, a timing error, and power noise on a system, affecting performance and reliability of the system. Therefore, during design of an integrated circuit (IC), a clock jitter analysis is usually performed at various stages of the design, to ensure timing stability and reliability of the design.

Conventionally, a clock jitter model is dynamically simulated during a clock jitter analysis. However, the manner is time-consuming, and is applicable to only analog circuits. In the above transistor level circuit simulation manner, large time and operation resources are consumed, and a huge digital circuit cannot be simulated through a circuit, and can only be roughly estimated. Therefore, when an analog circuit and a digital circuit block are integrated, a potential circuit timing problem cannot be identified quickly and accurately, increasing a risk of off-gauge circuits.

SUMMARY

The present disclosure provides an electronic device. The electronic device includes a storage device and a processing device. The storage device stores timing simulation information and voltage drop information of a plurality of clock paths. The processing device is electrically connected to the storage device. The processing device is configured to: read the timing simulation information and the voltage drop information, to obtain a maximum voltage drop and a minimum voltage drop of each of the plurality of clock paths based on the voltage drop information; perform a first static timing analysis (STA) with the maximum voltage drop based on the timing simulation information, to obtain a first timing report; perform a second STA with the minimum voltage drop based on the timing simulation information, to obtain a second timing report; calculate time information corresponding to each of the plurality of clock paths based on the first timing report and the second timing report; and select largest time information of the plurality of pieces of time information of the plurality of clock paths as a clock jitter.

The present disclosure further provides a clock jitter analysis method. The method includes: reading timing simulation information and voltage drop information of a plurality of clock paths; obtaining a maximum voltage drop and a minimum voltage drop of each of the plurality of clock paths based on the voltage drop information; performing a first STA with the maximum voltage drop based on the timing simulation information, to obtain a first timing report; performing a second STA with the minimum voltage drop based on the timing simulation information, to obtain a second timing report; calculating time information corresponding to each of the plurality of clock paths based on the first timing report and the second timing report; and selecting largest time information of the plurality of pieces of time information of the plurality of clock paths as a clock jitter.

In an embodiment, before reading the timing simulation information of the clock paths, the processing device further performs an analysis through the plurality of clock paths designed by a timing simulator, to obtain the timing simulation information.

In an embodiment, before reading the voltage drop information of the plurality of clock paths, the processing device further performs a calculation for the plurality of clock paths through a voltage simulator, to obtain the voltage drop information.

In an embodiment, the voltage drop information is a text file in a format of a dynamic voltage drop (DVD).

In an embodiment, a method for generating the text file in the format of the DVD includes: extracting the maximum voltage drop and the minimum voltage drop of each of the plurality of clock paths path from a voltage waveform diagram, and storing the maximum voltage drop and the minimum voltage drop in a text file format, to generate the text file in the format of the DVD.

In an embodiment, the first timing report is a first arrival time, the second timing report is a second arrival time, and the time information is a time difference between the first arrival time and the second arrival time.

In an embodiment, all of the clock paths form a clock tree.

In an embodiment, after the clock jitter is obtained, the clock jitter may be further verified.

In conclusion, the present disclosure provides an electronic device and a clock jitter analysis method. In the method, a clock jitter result may be verified, analyzed, and quickly obtained during IC design based on a cell level static timing analysis of a circuit. Therefore, the method is applicable to clock jitter prediction during a conventional transistor level circuit simulation analysis. In addition, in the present disclosure, a static check is adopted for the analysis, so that a jitter result close to an actual situation can be obtained compared with a dynamic check analysis. In this way, verification time can be effectively shortened, operation costs can be reduced, and a product yield and product competitiveness can be improved.

DETAILED DESCRIPTION

Figure 1:
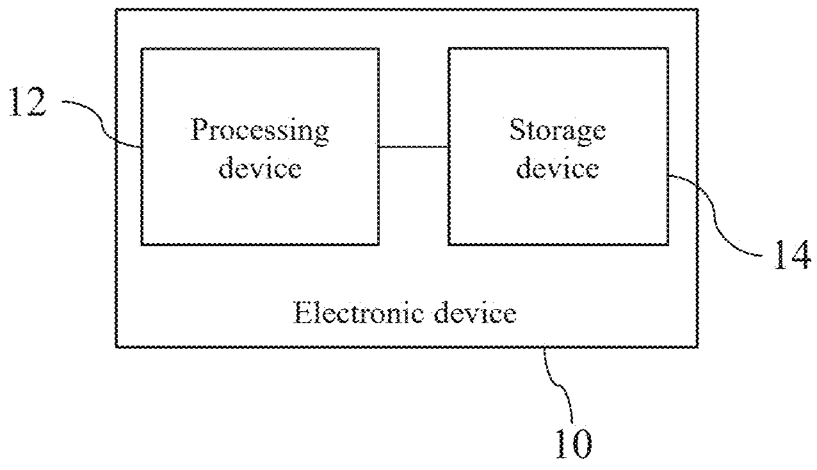
FIG. 1 is a schematic architectural diagram of an electronic device according to an embodiment of the present disclosure.

Preferred embodiments are described in detail below. However, the embodiments are merely used as examples for description and do not limit or reduce the protection scope of the present disclosure. In addition, some elements are omitted in drawings in the embodiments to clearly show technical features of the present disclosure. Same reference numerals in all of the drawings are used to indicate same or similar elements.

Referring to FIG. 1, an electronic device 10 includes a processing device 12 and a storage device 14. The processing device 12 is electrically connected to the storage device 14. The storage device 14 stores timing simulation information and voltage drop information of each of a plurality of clock paths. When the processing device 12 is to perform a static check, the processing device 12 reads the timing simulation information and the voltage drop information from the storage device 14, so as to perform a static timing analysis (STA) based on the timing simulation information and the voltage drop information. In an embodiment, the electronic device 10 is a personal computer, a notebook computer, a tablet computer, or the like. However, the present disclosure is not limited thereto.

In an embodiment, the processing device 12 is a central processing unit (CPU), another general-purpose or special-purpose microprocessor, a microcontroller, a micro control unit (MCU), a digital signal processor (DSP), a programmable controller, an application specific integrated circuit (ASIC), another similar element, or any combination of the foregoing elements. However, the present disclosure is not limited thereto.

In an embodiment, the storage device 14 may be a flash memory, a random access memory (RAM), a read-only memory (ROM), a hard disk (hard disk drive, HDD), or a solid state drive (SSD) in any form, another similar element, or any combination of the foregoing elements, and is configured to store any information, data, or the like required by the processing device 12. However, the present disclosure is not limited thereto.

Figure 2:
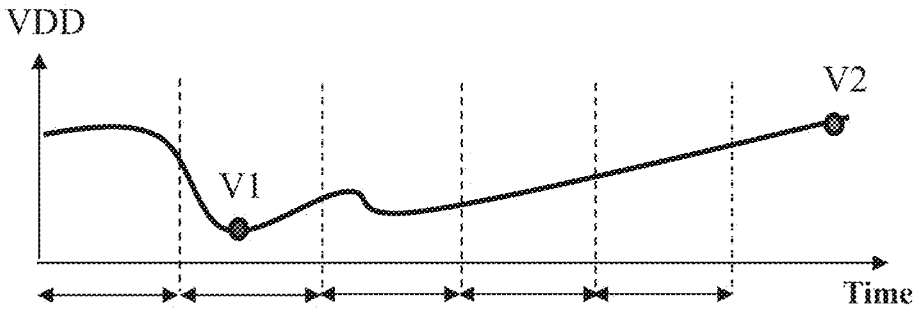
FIG. 2 is a corresponding voltage waveform diagram generated by a processing device based on a clock path according to an embodiment of the present disclosure.

In the electronic device 10, before performing a clock jitter analysis, the processing device 12 generates the timing simulation information and the voltage drop information based on a clock tree. The clock tree is composed of the plurality of clock paths. The processing device 12 performs an analysis through the plurality of clock paths of the clock tree designed by a timing simulator, to obtain the timing simulation information of each of the plurality of clock paths, and transmit all timing simulation information to the storage device 14 for storage. In an embodiment, the timing simulator is a software kit for a static timing analysis, such as Primetime. Before the processing device 12 performs the clock jitter analysis, the processing device 12 may perform a calculation for all of the clock paths through a voltage simulator, to obtain the voltage drop information of each of the plurality of clock paths, and transmit all voltage drop information to the storage device 14 for storage. In an embodiment, the voltage simulator is a software kit for a voltage calculation, such as RHSC. The voltage drop information may be a text file in a format of a dynamic voltage drop (DVD), which is generated by the processing device 12 through the software kit RHSC. The software kit RHSC generates a voltage waveform diagram corresponding to each of the plurality of clock paths, as shown in FIG. 2. A maximum voltage drop point V1 and a minimum voltage drop point V2 appear in the voltage waveform diagram. The processing device 12 may extract the maximum voltage drop and the minimum voltage drop of each of the plurality of clock paths from the voltage waveform diagram based on the maximum voltage drop point V1 and the minimum voltage drop point V2, and store the maximum voltage drop and the minimum voltage drop in a text file format, to generate a plurality of text files in the format of the DVD. The plurality of text files in the format of the DVD are stored in the storage device 14.

Figure 3:
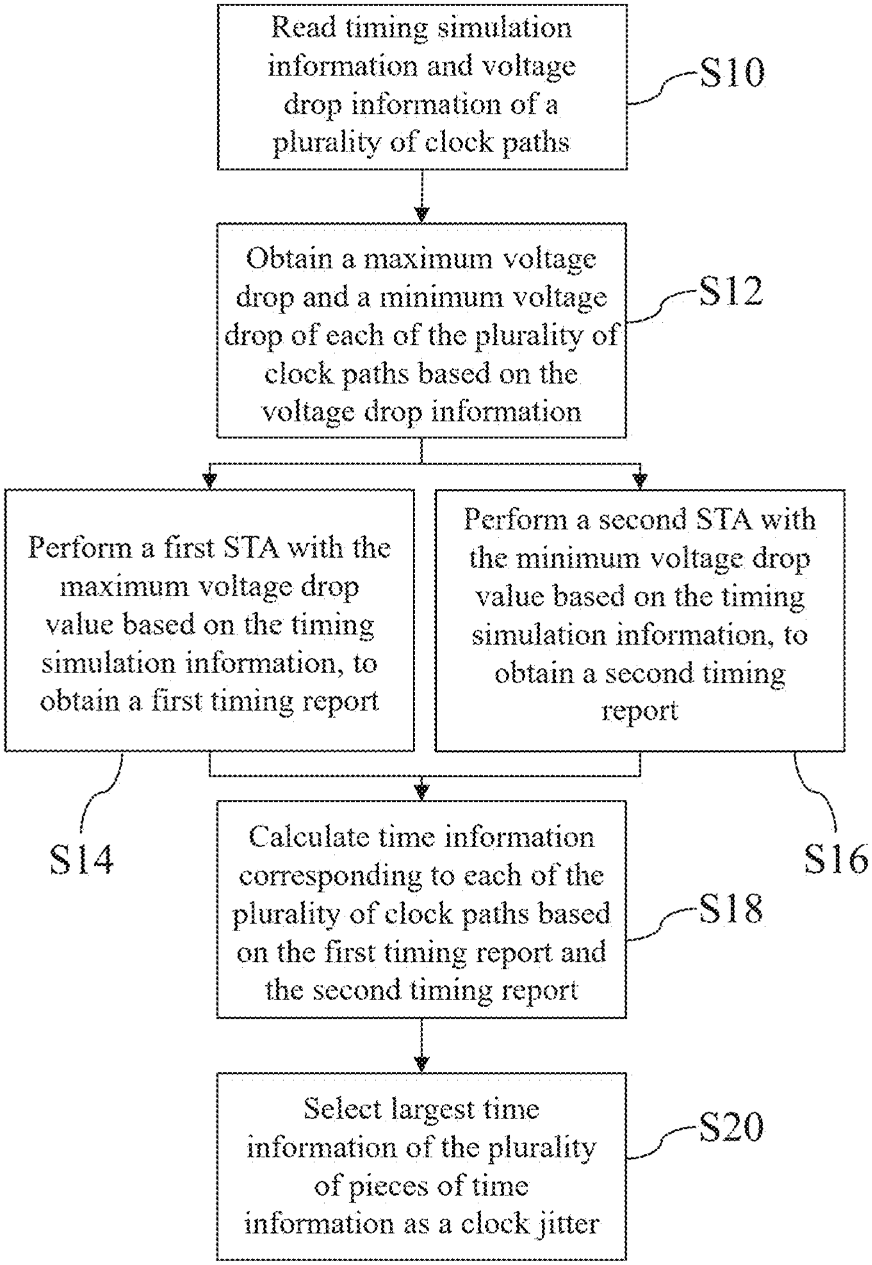
FIG. 3 is a schematic flowchart of analyzing a clock jitter according to an embodiment of the present disclosure.

In the electronic device 10, the processing device 12 may perform the clock jitter analysis through software. Refer to FIG. 1 and FIG. 3 together. As shown in step S10, the processing device 12 reads timing simulation information and voltage drop information corresponding to each of a plurality of clock paths from the storage device 14. As shown in step S12, the processing device 12 obtains a maximum voltage drop and a minimum voltage drop of each of the plurality of clock paths based on the voltage drop information. Next, as shown in step S14, the processing device 12 performs a first static timing analysis (STA) with the maximum voltage drop value based on the timing simulation information, to obtain a first timing report. As shown in step S16, the processing device 12 performs a second STA with the minimum voltage drop value based on the timing simulation information, to obtain a second timing report. After the first timing report and the second timing report are obtained, as shown in step S18, the processing device 12 calculates time information corresponding to each of the plurality of clock paths based on the first timing report and the second timing report. Specifically, when the first timing report is a first arrival time and the second timing report is a second arrival time, the time information is a time difference between the first arrival time and the second arrival time. In other words, a subtraction is performed between the first arrival time obtained through the first STA with the maximum voltage drop and the second arrival time obtained through the second STA with the minimum voltage drop, to obtain a corresponding absolute time difference. In this way, a time difference is calculated for each of the plurality of clock paths. Finally, as shown in step S20, the processing device 12 selects largest time information of the plurality of pieces of time information, that is, a largest time difference. The largest time information is a clock jitter. In the present disclosure, clock jitters caused by the DVD of all of the clock paths of the clock tree can be analyzed through the STA.

Figure 4:
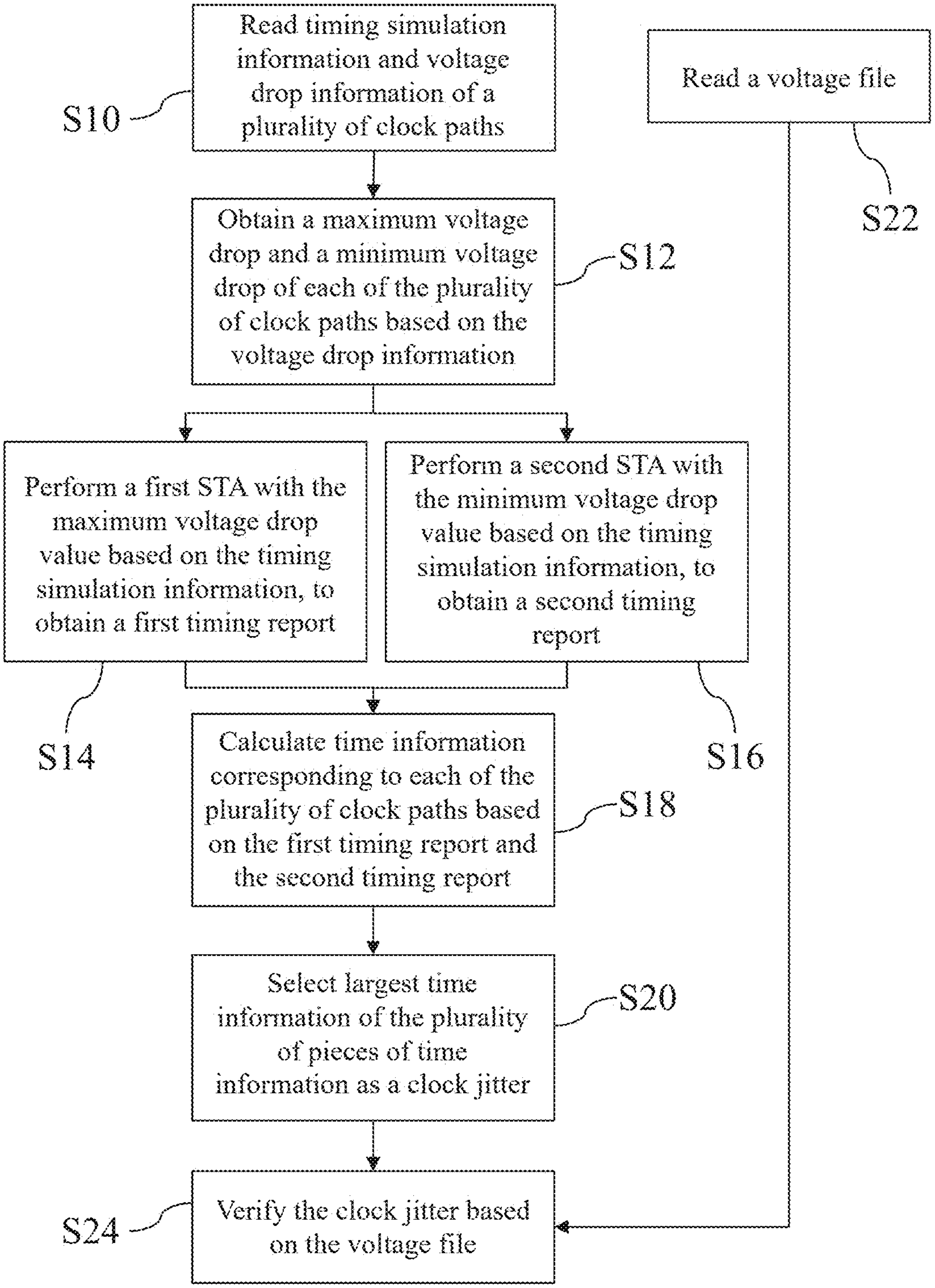
FIG. 4 is a schematic flowchart of analyzing and verifying a clock jitter according to an embodiment of the present disclosure.

Refer to FIG. 1 and FIG. 4 together. The storage device 14 further stores a plurality of voltage files (IR files). Each of the voltages files is in a format of a piecewise linear waveform (PWL) file, and is generated by the processing device 12 through the software kit RHSC. As shown in FIG. 1 and FIG. 4, after the processing device 12 generates the clock jitter by performing steps S10 to S20 successively, the processing device 12 may further selectively verify the clock jitter based on the voltage files. As shown in step S22, the processing device 12 reads a voltage file from the storage device 14. Then, as shown in step S24, the processing device 12 verifies the clock jitter based on the voltage file. In an embodiment, the processing device 12 verifies the clock jitter by using a built-in simulation program with integrated circuit emphasis (SPICE).

To verify that the analysis method in the present disclosure requires significantly less time, the analysis method in the present disclosure is compared with a conventional simulation method using the SPICE. A result is shown in Table 1. Operation time required for the analysis method in the present disclosure is approximately 226 minutes, and operation time required for the conventional simulation method using the SPICE is 600000 minutes. Through the analysis method of the present disclosure, an improvement of 2654 times can be achieved for the operation time required for obtaining the clock jitter. Therefore, a considerable amount of operation time can be saved.

TABLE 1

| Method | | Static check | Dynamic check |
|---|---|---|---|
| | Jitter value | 12.5 ps | 5.02 ps |
| Operation time | Analysis method of the present disclosure | 220 mins@$10^5$_path (static) + 6 mins (dynamic) = 226 (mins) | |
| | Simulation method using SPICE | 6*$10^5$_path = 600000 mins | |
| Improvement in operation time | | 2654 times | |

In conclusion, the present disclosure provides an electronic device and a clock jitter analysis method. In the method, a clock jitter result may be verified, analyzed, and quickly obtained during IC design based on a cell level static timing analysis of a circuit. Therefore, the method is applicable to clock jitter prediction during a conventional transistor level circuit simulation analysis. In addition, the clock jitter can be estimated through only one static check. In addition, in the present disclosure, the static check is adopted for the analysis, so that a jitter result close to an actual situation (having a high accuracy) can be quickly obtained compared with a dynamic check analysis. In this way, verification time can be effectively shortened, operation costs (including machine operation costs and software usage costs) can be reduced, and a product yield and product competitiveness can be effectively improved.

The foregoing embodiments are merely used for describing the technical ideas and characteristics of the present disclosure, to enable a person skilled in the art to understand and hereby implement the content of the present disclosure. However, the scope of the claims of the present disclosure is not limited thereto. In other words, any equivalent changes or modifications made according to the spirit disclosed in the present disclosure shall still fall into scope of the claims of the present disclosure.

What is claimed is:

1. An electronic device, comprising:

a storage device, storing timing simulation information and voltage drop information of a plurality of clock paths; and a processing device, electrically connected to the storage device, wherein the processing device is configured to: read the timing simulation information and the voltage drop information, to obtain a maximum voltage drop and a minimum voltage drop of each of the plurality of clock paths based on the voltage drop information; perform a first static timing analysis (STA) with the maximum voltage drop based on the timing simulation information, to obtain a first timing report; perform a second STA with the minimum voltage drop based on the timing simulation information, to obtain a second timing report; calculate time information corresponding to each of the plurality of clock paths based on the first timing report and the second timing report; and select largest time information of the plurality of pieces of time information of the plurality of clock paths as a clock jitter.

2. The electronic device according to claim 1, wherein the processing device is further configured to perform an analysis through the plurality of clock paths designed by a timing simulator, to obtain the timing simulation information.

3. The electronic device according to claim 1, wherein the processing device is further configured to perform a calculation for the plurality of clock paths through a voltage simulator, to obtain the voltage drop information.

4. The electronic device according to claim 1, wherein the voltage drop information is a text file in a format of a dynamic voltage drop (DVD).

5. The electronic device according to claim 4, wherein a method for the processing device to generate the text file in the format of the DVD comprises: extracting the maximum voltage drop and the minimum voltage drop of each of the plurality of clock paths from a voltage waveform diagram, and storing the maximum voltage drop and the minimum voltage drop in a text file format, to generate the text file in the format of the DVD.

6. The electronic device according to claim 1, wherein the first timing report is a first arrival time, the second timing report is a second arrival time, and the time information is a time difference between the first arrival time and the second arrival time.

7. The electronic device according to claim 1, wherein the plurality of clock paths form a clock tree.

8. The electronic device according to claim 1, wherein the processing device is further configured to verify the clock jitter.

9. A clock jitter analysis method, comprising:

reading timing simulation information and voltage drop information of a plurality of clock paths;

obtaining a maximum voltage drop and a minimum voltage drop of each of the plurality of clock paths based on the voltage drop information;

performing a first STA with the maximum voltage drop based on the timing simulation information to obtain a first timing report;

performing a second STA with the minimum voltage drop based on the timing simulation information to obtain a second timing report;

calculating time information corresponding to each of the plurality of clock paths based on the first timing report and the second timing report; and selecting largest time information of the plurality of pieces of time information of the plurality of clock paths as a clock jitter.

10. The clock jitter analysis method according to claim 9, wherein before reading the timing simulation information of the plurality of clock paths, the method further comprises: performing an analysis through the plurality of clock paths designed by a timing simulator, to obtain the timing simulation information.

11. The clock jitter analysis method according to claim 9, wherein before reading the voltage drop information of the plurality of clock paths, the method further comprises: performing a calculation for the plurality of clock paths through a voltage simulator, to obtain the voltage drop information.

12. The clock jitter analysis method according to claim 9, wherein the voltage drop information is a text file in a format of a DVD.

13. The clock jitter analysis method according to claim 12, wherein a method for generating the text file in the format of the DVD comprises: extracting the maximum voltage drop and the minimum voltage drop of each of the plurality of clock paths from a voltage waveform diagram, and storing the maximum voltage drop and the minimum voltage drop in a text file format, to generate the text file in the format of the DVD.

14. The clock jitter analysis method according to claim 9, wherein the first timing report is a first arrival time, the second timing report is a second arrival time, and the time information is a time difference between the first arrival time and the second arrival time.

15. The clock jitter analysis method according to claim 9, wherein the plurality of clock paths form a clock tree.

16. The clock jitter analysis method according to claim 9, further comprising: verifying the clock jitter.

* * * * *